June 4, 1957  W. O. GILES  2,794,897
COMBINATION DOUGHNUT AND DEEP FAT KETTLE
Filed Dec. 3, 1954  2 Sheets-Sheet 1

INVENTOR.
WILLIAM O. GILES,
BY
McMorrow, Berman + Davidson
ATTORNEYS.

June 4, 1957 W. O. GILES 2,794,897
COMBINATION DOUGHNUT AND DEEP FAT KETTLE
Filed Dec. 3, 1954 2 Sheets-Sheet 2

INVENTOR.
WILLIAM O. GILES,
BY
McMorrow, Berman & Davidson
ATTORNEYS.

United States Patent Office 2,794,897
Patented June 4, 1957

2,794,897
COMBINATION DOUGHNUT AND DEEP FAT KETTLE

William O. Giles, Orlando, Fla.

Application December 3, 1954, Serial No. 472,853

2 Claims. (Cl. 219—44)

This invention relates to a kettle which is particularly adapted for cooking a substantial quantity of doughnuts over a relatively small period of time, thus to adapt the device for commercial usage in restaurants, bakeries, roadside stands, and the like. The device, however, is adapted not only for the rapid and proper cooking of doughnuts, but also is adapted for use as a deep fat kettle for frying any of various foods that are to be cooked in this manner.

Summarized briefly, the invention comprises a kettle which can be formed of stainless steel or other easily cleaned, attractive, sanitary sheet metal material. The device includes a housing or casing of rectangular formation having an open top, in which is removably positioned a receptacle for the deep fat. Mounted upon the casing is a support on which is hingedly mounted a heating element designed particularly to fit in and extend through the full periphery of the bottom of the receptacle. The heating element can be swung into and out of the receptacle into operative and inoperative positions respectively, as desired. Mounted upon the support is a vertical post, and carried by the post above the receptacle is an articulated, horizontally extending support terminating at its outer end in a frame or rack particularly adapted to receive a doughnut making machine of known design.

Due to the arrangement shown, the rack can be positioned over any selected part of the open top of the deep fat container, thereby to facilitate the dropping of doughnuts into selected portions of the container area. Further, the rack can be swung to an out-of-the-way side or back position, when the doughnuts are being removed or when other foods are being cooked in the container. Still further, the heating element can be swung upwardly to an inoperative position, when the articulated support and rack have been swung to said side or back position thus to facilitate cleaning of the device and also to permit use of the container for other purposes.

Among important objects of the invention are to provide a deep fat doughnut cooker or frying kettle which will be characterized by its simplicity of design and the ease in which it can be kept clean.

Another object is to provide a cooking device as stated which will be specifically adapted to make use of conventional, previously designed doughnut forming and dropping machines.

Still another object is to provide a cooking device as described in which the articulated, doughnut machine support rack means will especially facilitate the rapid location of the outlet of the doughnut forming machine over any part of the deep fat container.

Still another object is to provide an improved design of heating element, carried by a hinged member, which heating element will be composed of closely spaced coils lying in horizontal planes, said coils or convolutions extending through substantially the full area of the container adjacent the side wall thereof, so as to be disposed out of the way while still being properly located to uniformly charge the deep fat with heat in a minimum amount of time.

Other objects will appear from the following description, the claims appended thereto, and from the annexed drawing, in which like reference characters designate like parts throughout the several views, and wherein:

Figure 4:
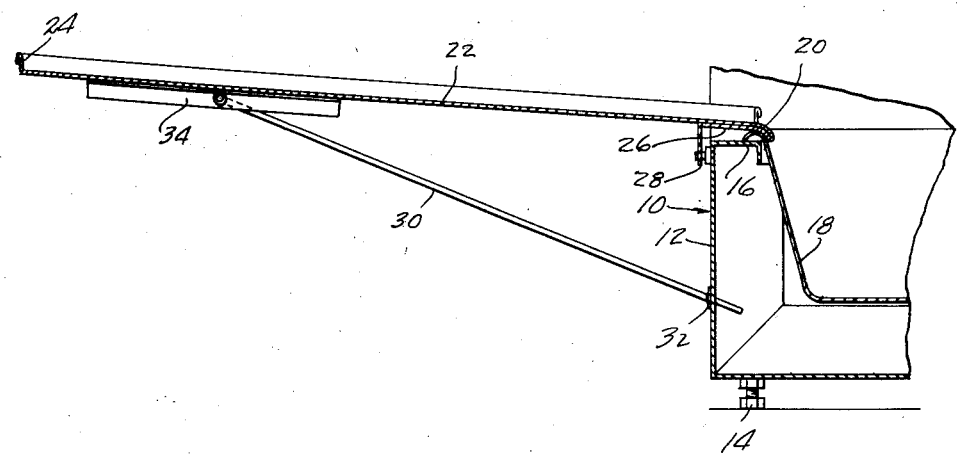
Figure 4 is an enlarged, fragmentary, longitudinal sectional view on line 4—4 of Figure 1.
Figure 2:
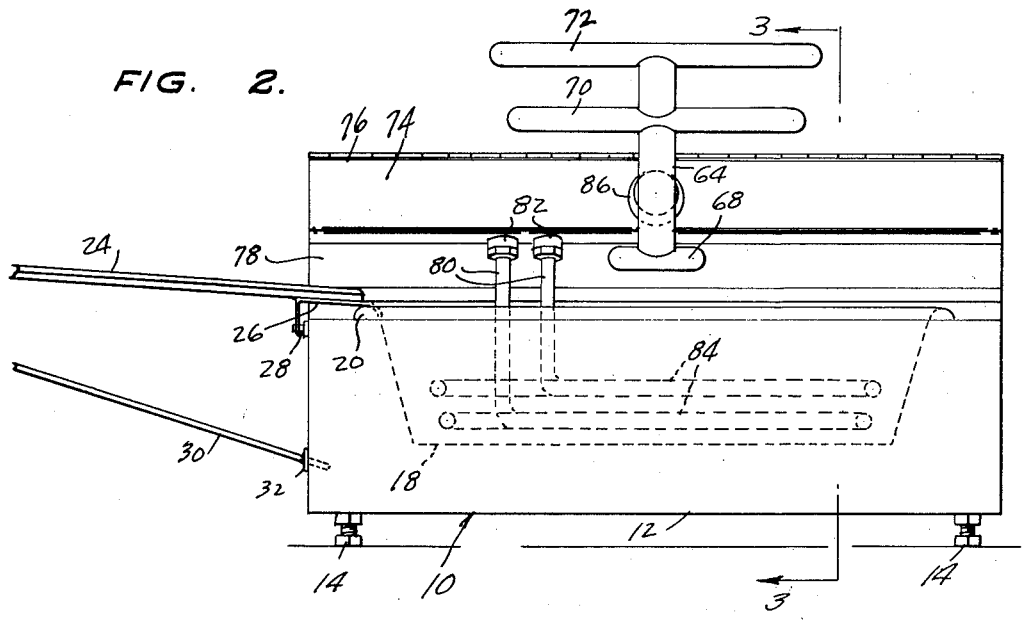
Figure 2 is an enlarged front elevational view of the device in which a portion of the drain rack or tray is broken away.

The reference numeral 10 has been applied generally to a sheet metal casing, which is in the shape of a rectangular body 12 supported upon adjustable feet 14. Integrally formed upon the top edge of the body is an inwardly directed, peripheral flange 16, extending about the open top of the casing. A drain tray 22 is formed as a generally rectangular, elongated, flat member the sides and outer ends of which are provided with a low, upwardly directed lip 24. The tray is inclined slightly from the horizontal when in use as shown in Figure 4, and at its inner end is integrally formed with a reversely folded inner end portion 26 of inverted L-shape in cross section secured by screws 28 or equivalent fastening elements to the adjacent end of the casing 12.

To support the tray in the desired position, there are provided base rods 30, threadedly or otherwise connected to washers 32 carried by the adjacent end of the casing body 12. The brace rods are inclined from the horizontal, and at their outer ends are pivotally connected to longitudinal flanges 34 of angular cross section secured fixedly to the underside of the tray body adjacent the outer end of said tray body. By reason of this arrangement, the tray can be swung about the axis of its pivotal connection to the outer ends of the brace rods, so as to facilitate the cleaning of the tray. The tray, of course, is used to support racks of doughnuts after the doughnuts have been cooked and have been removed from the deep fat container 18.

A rectangular container 18 has an outwardly directed flange 20 extending through the full periphery thereof and seating upon the flange 16. The container 18 thus can be readily removed from the casing body whenever desired, for the purpose of emptying the fat or cleaning the container or the casing body 12.

Figure 3:
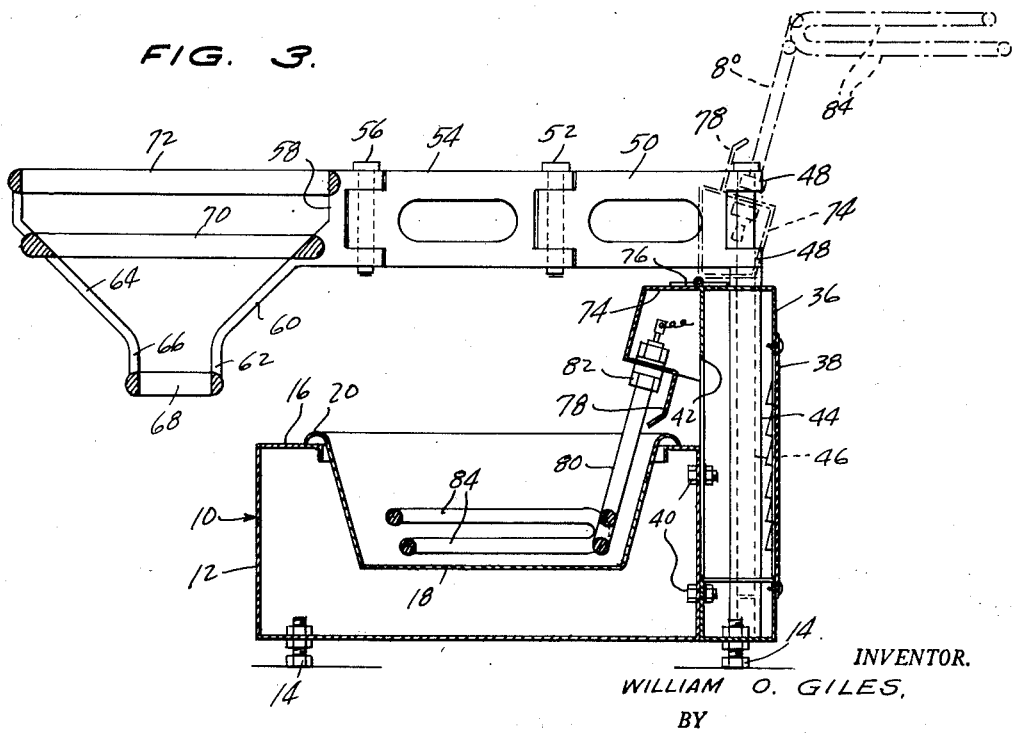
Figure 3 is a transverse sectional view on line 3—3 of Figure 2, the dotted lines showing the heating element in an inoperative position.

An upstanding, rectangular, hollow housing 36, relatively narrow in depth but extending to a height substantially above the top plane of the casing body, is formed open at its back, and removably secured to and closing the open back of housing 36 is a flat, louvered plate 38. Connecting screws 40 are employed to secure the front wall of the housing 36 to the back wall of the casing 10, as shown in Figure 3.

The housing 36 is formed with an open front, and visible through said open front is a vertically disposed sleeve 44 disposed medially between the opposite ends of housing 36. A post is extended within said sleeve, and projects above the top surface of the housing 36. The upwardly projecting portion of the post 46 extends through vertically spaced hinge sleeves 48 formed upon an inner hinge section 50, connected by a hinge pin 52 at its other end to one end of an intermediate hinge section 54 hingedly connected at 56 to an outer hinge section 58. Hinge section 58 is integrally formed with a downwardly extending, inclined arm 60 terminating at its lower extremity in a vertically disposed, short, lower end portion 62. Diametrically opposite arm 60, and formed identically but oppositely thereto, is an arm 64 having a vertically disposed lower end portion 66. Fixedly connected to the portions 62, 66, as by being formed integrally therewith, is a small diameter ring 68. A middle ring 70, of substantially greater diameter than ring 68, is integrally or otherwise fixedly secured to the divergent upper end portions of the arms 60, 64. Above the ring 70 there is provided a top ring 72, of a diameter slightly greater than that of ring 70. Ring 72 is welded or integrally connected to the upper ends of the arms 60, 64.

Figure 1:
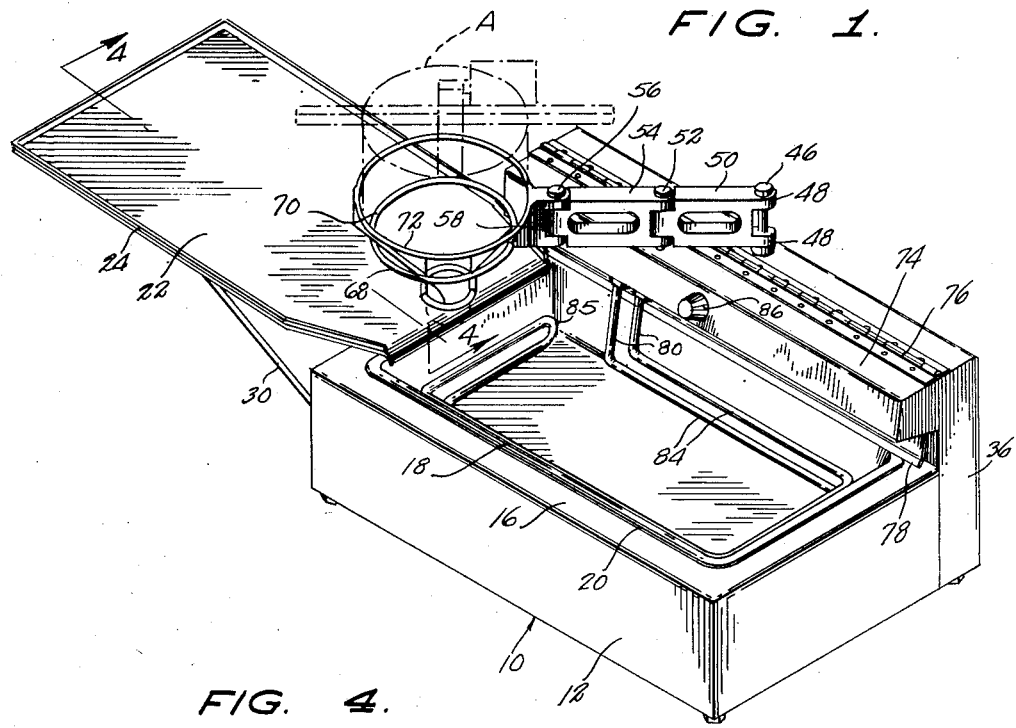
Figure 1 is a perspective view of a combination doughnut and deep fat kettle formed in accordance with the present invention, a doughnut forming machine being illustrated in dotted outline operatively associated with the device constituting the present invention.

The rings 70, 72, 68 lie in horizontal planes, and are adapted to define, in cooperation with their associated arms 60, 64, an open rack or frame work in which can be supported a conventional doughnut forming machine designated by the reference letter A in Figure 1. Such a machine has a cylindrical, large diameter body about which the top ring 72 would extend, said body at its lower end tapering so as to be supported within the rings 70. At its lower extremity, the doughnut making machine has a small diameter, cylindrical, depending spout about which the ring 68 would extend.

Conventionally, a machine of the type stated is manually operated to form, in rapid succession, doughnuts from batter contained within the machine casing A. The doughnuts are ejected from the lower end or spout of the machine A, into the deep fat.

Due to the articulated rack support means 50, 54, 58, the machine A can be disposed at any selected location above the deep fat container 18. This is of importance, in view of the fact that one part of the container may have a substantial number of doughnuts cooking therein, while another part may be comparatively free of doughnuts. It is desirable, so that all parts will be uniformly covered with doughnuts, to facilitate the free movement of the machine support rack over the entire area of the deep fat. Further, the articulated construction permits the rack to be shifted completely to an out-of-the-way location, as for example, when no other doughnuts are to be dropped into the deep fat. Under these circumstances, during which the doughnuts are all being removed from the deep fat, it is desirable, of course, to locate the machine A where it will not interfere with the doughnut-removing operation.

Disposed in front of the projecting upper end portion of the housing 36, and extending the full length of said housing 36, is a heating element support member 74 of trapezoidal cross section as shown in Figure 3. Support member 74 extends the full length of housing 36, and is hingedly connected to the top of the housing as at 76 to swing between the full and dotted line positions of Figure 3. Integrally formed upon the lower end of the member 74 is a protective, longitudinal flange 78 which extends across the open front of the housing 36 when the member 74 is in its operative, full line position of Figure 3.

A heating element has parallel end portions 80 secured by nuts 82 to the member 74, medially between the opposite ends of said member 74. The intermediate portion of the heating element is formed into a pair of rectangular convolutions extending through substantially the full periphery of the rectangular deep fat container as shown in Figure 1. The convolutions lie in closely spaced, horizontal planes, and at one end are integrally connected by a bight portion 85.

When the member 74 is in its full line position of Figure 3, the heating element is recessed within the deep fat container 18, and is disposed adjacent the bottom of the container, extending along the several walls thereof. In this position of the heating element, it does not interfere with the proper cooking of the doughnuts or other food items.

When, however, it is desired to remove the heating element from the deep fat container, it need merely be swung upwardly to the dotted line position of Figure 3. In this position, the member 74 is supported upon the top of the housing 36, while the heating element extends upwardly and rearwardly from the device. Due to this arrangement, the deep fat container can be removed, cleaned, and then returned into its proper location.

The heating element will, of course, be controlled by switch means such as that shown at 86, mounted upon the member 74, and no attempt is made herein to show the wiring employed, since this is clearly within the skill of those working regularly in the art, requiring no special illustration herein.

As will be noted by a reference to the several figures of the drawing individually and in relation to one another, the convolutions 84 of the heating element lie wholly in planes parallel to the plane of the flat bottom wall of the container 18, the planes of the convolutions being spaced vertically of the side wall of the container. Further, it will be noted that the convolutions, over their full lengths, parallel the periphery of the bottom wall.

The convolutions, further, are confined wholly to the peripheral area of the container, that is, they extend entirely within the marginal area of the container above the marginal portion of the bottom wall. This leaves the remaining or center area of the container wholly clear of obstructions over the full container depth, so that, for example, if it is desired to use the deep fat kettle for the cooking of foods confined in a basket inserted in the container, said basket may be seated directly upon the bottom wall of the container. This has the advantage that when deep fat is deposited in the container, foods confined in the basket would be capable of immersion in the deep fat over the full depth of the fat.

Still further, the arrangement wherein the heating element can be swung between its full and dotted line positions has certain advantages, which may be particularly noted by reference to Figure 3. The housing 36 has a flat top surface in a plane paralleling that of the bottom wall and the heating element support member 74 also has a flat top surface, which as shown by reference to the full line position of Figure 3 is in a plane common to that of the top surface of the housing when the heating element is extended into the container. The top surface of the member 74, as shown in dotted lines, is in a plane paralleling that of the top surface of the housing when the member 74 is swung about its hinge axis through 180 degrees from the full to the dotted line positions.

Since the end portions 80 of the heating element are fixedly connected to the member 74 and extend downwardly therefrom in the use position of the heating element, and since the convolutions project forwardly from the end portions 80 in said use position, on swinging movement of the member 74 from the full to the dotted line positions the convolutions 84 will extend rearwardly from the housing 46 above the same. This has the desirable characteristic that the heating element is horizontally disposed when not in use, to facilitate cleaning thereof. The further advantage is present in the construction, deriving from the extension of the convolutions rearwardly from the housing, in a position in which they will be completely out of the way when the device is not in use, and will not be as susceptible to being swung forwardly from their inoperative positions accidentally, as they would be if, for example, the heating element extended straight upwardly in a vertical position from the housing when not in use.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. In a deep fat kettle, a housing having a flat top surface; a container for deep fat projecting forwardly from the housing below said top surface and having a flat bottom wall in a plane parallel to that of the top surface and a side wall extending upwardly from said bottom wall; a heating element support member hingedly connected to the housing for swinging movement between opposite extreme positions angularly spaced 180 degrees apart about the hinge axis of the member, said member having a surface in a plane common to that of the top surface of the housing in one position to which the member is swung, said surface of the member overlying said top surface of the housing in a plane parallel to that of the housing top surface on swinging movement of the member to its opposite extreme position; and a heating element extending within the container in spaced relation to the bottom and side walls and confined wholly to the peripheral area of the container, thus to leave the remaining area of the container wholly free of obstructions through the full container depth, said element being formed from a single length of rod material having its end portions connected fixedly to the heating element support member and extending downwardly from the heating element support member in said one position of the member, the intermediate portion of said length of rod material being formed into a plurality of convolutions projecting forwardly from the end portions in said one position of the heating element support member, each of said convolutions lying wholly in a plane paralleling those of the bottom wall and the top surface of the housing, for extension of the convolutions rearwardly from the housing above the same on swinging movement of said member from said one to said other position thereof.

2. In a deep fat kettle, a housing having a flat top surface; a container for deep fat projecting forwardly from the housing below said top surface and having a flat bottom wall in a plane parallel to that of the top surface and a side wall extending upwardly from said bottom wall; a heating element support member hingedly connected to the housing for swinging movement between opposite extreme positions angularly spaced 180 degrees apart about the hinge axis of the member, said member having a surface in a plane common to that of the top surface of the housing in one position to which the member is swung, said surface of the member overlying said top surface of the housing in a plane parallel to that of the housing top surface on swinging movement of the member to its opposite extreme position; and a heating element extending within the container in spaced relation to the bottom and side walls thereof in said one position of the support member, said element comprising a length of rod material having end portions connected fixedly to the support member and extending downwardly therefrom in said one position of the support member and upwardly from the support member when the member is in its opposite extreme position, the intermediate portion of said length being formed into convolutions projecting forwardly from the end portions and from said member in a position substantially centered within the container when the support member is in said one position thereof, the convolutions projecting rearwardly from the end portions and from said member in the opposite extreme position of the support member, thus to overbalance the member on its pivot axis in said one position thereof in a direction tending to swing the same downwardly beyond said one position, the support member having a part abutting the housing in said one position of the member to limit movement of the support member beyond said one position and hold the convolutions in their centered position within the container, the convolutions in the opposite extreme position of the support member overbalancing the same on its pivot axis in an opposite direction, to maintain said surface of the member in position bearing against the top surface of the housing.

References Cited in the file of this patent
UNITED STATES PATENTS

| | | |
|---|---|---|
| 759,618 | Korbel | May 10, 1904 |
| 1,330,564 | Winkler | Feb. 10, 1920 |
| 2,232,998 | Cernohouz et al. | Feb. 25, 1941 |
| 2,256,617 | Kipnis | Sept. 23, 1941 |
| 2,448,215 | George | Aug. 31, 1948 |
| 2,538,566 | Jones | Jan. 16, 1951 |
| 2,695,947 | Heerdt | Nov. 30, 1954 |
| 2,748,243 | Michaelis | May 29, 1956 |